US012795123B2

(12) United States Patent
Yu et al.

(10) Patent No.: US 12,795,123 B2
(45) Date of Patent: Nov. 10, 2026

(54) WEIGHTED PREDICTION FOR VIDEO CODING

(71) Applicant: GUANGDONG OPPO MOBILE TELECOMMUNICATIE CORP., LTD., Dongguan (CN)

(72) Inventors: Yue Yu, Palo Alto, CA (US); Haoping Yu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 37 days.

(21) Appl. No.: 18/372,134

(22) Filed: Sep. 25, 2023

(65) Prior Publication Data

US 2024/0022731 A1 Jan. 18, 2024

Related U.S. Application Data

(63) Continuation of application No. PCT/US2022/022325, filed on Mar. 29, 2022.
(Continued)

(51) Int. Cl.
*H04N 19/184* (2014.01)
*H04N 19/146* (2014.01)
(Continued)

(52) U.S. Cl.
CPC ......... *H04N 19/184* (2014.11); *H04N 19/146* (2014.11); *H04N 19/172* (2014.11);
(Continued)

(58) Field of Classification Search
None
See application file for complete search history.

(56) References Cited

U.S. PATENT DOCUMENTS

2006/0215762 A1* 9/2006 Han ..................... H04N 19/137 375/E7.153
2009/0003457 A1* 1/2009 Liu ..................... H04N 19/134 375/E7.176
(Continued)

FOREIGN PATENT DOCUMENTS

WO 2021045658 A2 3/2021

OTHER PUBLICATIONS

International Search Report in the international application No. PCT/US2022/022325, mailed on Aug. 3, 2022, 2 pages.
(Continued)

*Primary Examiner* — David N Werner
(74) *Attorney, Agent, or Firm* — BAYES PLLC

(57) ABSTRACT

A computer-implemented method for encoding or decoding an input video is provided. The method includes determining a bit depth associated with the input video; determining a bit depth associated with weighted prediction offset values for the input video based on the bit depth associated with the input video; determining weighted prediction values for pictures of the input video based on an application of the weighted prediction offset values to prediction values for the pictures of the input video; and processing the input video based on the weighted prediction values and the weighted prediction offset values. An encoder and an decoder are further provided.

20 Claims, 7 Drawing Sheets

Related U.S. Application Data

(60) Provisional application No. 63/168,221, filed on Mar. 30, 2021.

(51) Int. Cl.
*H04N 19/172* (2014.01)
*H04N 19/46* (2014.01)
*H04N 19/70* (2014.01)
*H04N 19/61* (2014.01)

(52) U.S. Cl.
CPC ............ *H04N 19/46* (2014.11); *H04N 19/70* (2014.11); *H04N 19/61* (2014.11)

(56) References Cited

U.S. PATENT DOCUMENTS

| | | | | |
|---|---|---|---|---|
| 2009/0003718 | A1* | 1/2009 | Liu | H04N 19/102 345/589 |
| 2009/0087111 | A1 | 4/2009 | Noda | |
| 2013/0259130 | A1* | 10/2013 | Coban | H04N 19/70 375/240.15 |
| 2014/0153645 | A1* | 6/2014 | Zhang | H04N 19/513 375/240.12 |
| 2014/0269939 | A1* | 9/2014 | Guo | H04N 19/34 375/240.26 |
| 2014/0321546 | A1* | 10/2014 | Sakurai | H04N 13/161 375/240.16 |
| 2015/0131721 | A1* | 5/2015 | Yu | H04N 19/139 375/240.12 |
| 2015/0181214 | A1* | 6/2015 | Alshina | H04N 19/14 375/240.02 |
| 2015/0181252 | A1* | 6/2015 | Alshina | H04N 19/86 375/240.24 |
| 2016/0182883 | A1* | 6/2016 | Zhang | H04N 19/52 375/240.08 |
| 2016/0337665 | A1* | 11/2016 | Yoo | H04N 19/70 |
| 2017/0019668 | A1* | 1/2017 | Morigami | H04N 19/117 |
| 2017/0119668 | A1* | 5/2017 | Keselowsky | A61K 9/1635 |
| 2019/0104309 | A1* | 4/2019 | Su | H04N 19/124 |
| 2020/0404265 | A1 | 12/2020 | Yamazaki | |
| 2021/0099700 | A1* | 4/2021 | Li | H04N 19/186 |
| 2021/0281863 | A1* | 9/2021 | Li | H04N 19/105 |
| 2021/0289221 | A1* | 9/2021 | Misra | H04N 19/96 |
| 2022/0014738 | A1* | 1/2022 | Li | H04N 19/80 |
| 2022/0201336 | A1* | 6/2022 | Filippov | H04N 19/573 |
| 2022/0232224 | A1* | 7/2022 | Xu | H04N 19/157 |
| 2022/0264122 | A1* | 8/2022 | Zhu | H04N 19/167 |
| 2023/0336715 | A1* | 10/2023 | Yu | H04N 19/176 |
| 2025/0047850 | A1* | 2/2025 | Sullivan | H04N 19/124 |

OTHER PUBLICATIONS

Written Opinion of the International Search Authority in the international application No. PCT/US2022/022325, mailed on Aug. 3, 2022, 6 pages.

B. Bross, W.-J. Han, J.-R. Ohm, G. J. Sullivan, T. Wiegand, “Versatile Video Coding Editorial Refinements on Draft 10,” Document of Joint Video Experts Team of ITU-T SG 16 WP 3 and ISO/IEC JTC 1/SC 29, JVET-T2001_v2, 20th Meeting: by teleconference, Oct. 7-16, 2020, cited in p. 70-75 and 161-172, 513 pages.

Flynn D et al: “HEVC Range Extensions Draft 5”, 15. JCT-VC Meeting; Oct. 23, 2013-Nov. 1, 2013; Geneva; (Joint Collaborative Team on Video Coding of ISO/IEC JTC1/SC29/WG11 and ITU-T SG.16 ); No. JCTVC-O1005, Nov. 19, 2013 (Nov. 19, 2013), XP030115459, section 7.4.3.2, section 7.4.7.3, section 8.5.3.3.4.3.

Bross B et al: “Versatile Video Coding Editorial Refinements on Draft 10”, 20. JVET Meeting; Oct. 7, 2020-Oct. 16, 2020; Teleconference; (The Joint Video Exploration Team of ISO/IEC JTC1/SC29/WG11 and ITU-T SG.16 ), No. JVET-T2001, Oct. 30, 2020 (Oct. 30, 2020), XP030293629, section 7.4.3.4 (p. 122), section 7.4.3.5 (p. 132).

Yu (Oppo) Y et al: “AHG8: Weighted Prediction for VVC High Bit Depth Extension”, 22. JVET Meeting; Apr. 20, 2021- Apr. 28, 2021; Teleconference; (The Joint Video Exploration Team of ISO/IEC JTC1/SC29/WG11 and ITU-T SG.16), No. JVET-V0124 ; m56539, Apr. 14, 2021 (Apr. 14, 2021), XP030294322, section 2.

Supplementary European Search Report in the European application No. 22772349.1, mailed on Jan. 7, 2025. 11 pages.

* cited by examiner

WEIGHTED PREDICTION FOR VIDEO CODING

CROSS-REFERENCE TO RELATED APPLICATIONS

The present application is a continuation of International Patent Application No. PCT/US2022/022325 filed on Mar. 29, 2022, which claims the benefit of priority to U.S. Provisional Patent Application No. 63/168,221 filed on Mar. 30, 2021 and entitled "WEIGHTED PREDICTION FOR VIDEO CODING." The entire contents of the prior applications are incorporated herein by reference in their entireties.

BACKGROUND

The continuing consumer demand for video technology to deliver video content at higher quality and faster speed has encouraged continuing efforts to develop improvements to video technology. For example, the Moving Picture Experts Group (MPEG) has established standards for video coding so that there can be a common framework in which various video technologies can operate and be compatible with each other. In 2001, MPEG and the International Telecommunication Union (ITU) formed the Joint Video Team (JVT) to develop a video coding standard. The result of the JVT was the H.264/Advanced Video Coding (AVC) standard. The AVC standard was utilized in various video technology innovations at the time, such as Blu-ray video discs. Subsequent teams have developed additional video coding standards. For example, The Joint Collaborative Team on Video Coding (JCT-VC) developed the H.265/High Efficiency Video Coding (HEVC) standard. The Joint Video Exploration Team (JVET) developed the H.266/Versatile Video Coding (VVC) standard.

SUMMARY

In a first aspect, various embodiments of the present disclosure provide a computer-implemented method for encoding or decoding an input video, comprising determining a bit depth associated with the input video; determining a bit depth associated with weighted prediction offset values for the input video based on the bit depth associated with the input video; determining weighted prediction values for pictures of the input video based on an application of the weighted prediction offset values to prediction values for the pictures of the input video; and processing the input video based on the weighted prediction values and the weighted prediction offset values.

In a second aspect, various embodiments of the present disclosure provide an encoder comprising at least one processor; and a memory storing instructions that, when executed by the at least one processor, cause the encoder to perform determining a bit depth associated with the input video; determining a bit depth associated with weighted prediction offset values for the input video based on the bit depth associated with the input video; determining weighted prediction values for pictures of the input video based on an application of the weighted prediction offset values to prediction values for the pictures of the input video; encoding the input video based on the weighted prediction values and the weighted prediction offset values; and setting picture level flags in the encoded input video to signal which pictures in the encoded input video have weighted prediction applied.

In a third aspect, various embodiments of the present disclosure provide a decoder comprising at least one processor; and a memory storing instructions that, when executed by the at least one processor, cause the decoder to perform determining a bit depth associated with the input video; determining a bit depth associated with weighted prediction offset values for the input video based on the bit depth associated with the input video; determining a sequence level flag in the input video that indicates a sequence of the input video has weighted prediction applied; determining weighted prediction values for the sequence of the input video based on an application of the weighted prediction offset values to prediction values for the sequence of the input video; and decoding the input video based on the weighted prediction values and the weighted prediction offset values.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The present disclosure, in accordance with one or more various embodiments, is described in detail with reference to the following figures. The figures are provided for purposes of illustration only and merely depict typical or exemplary embodiments.

Figure 1A:
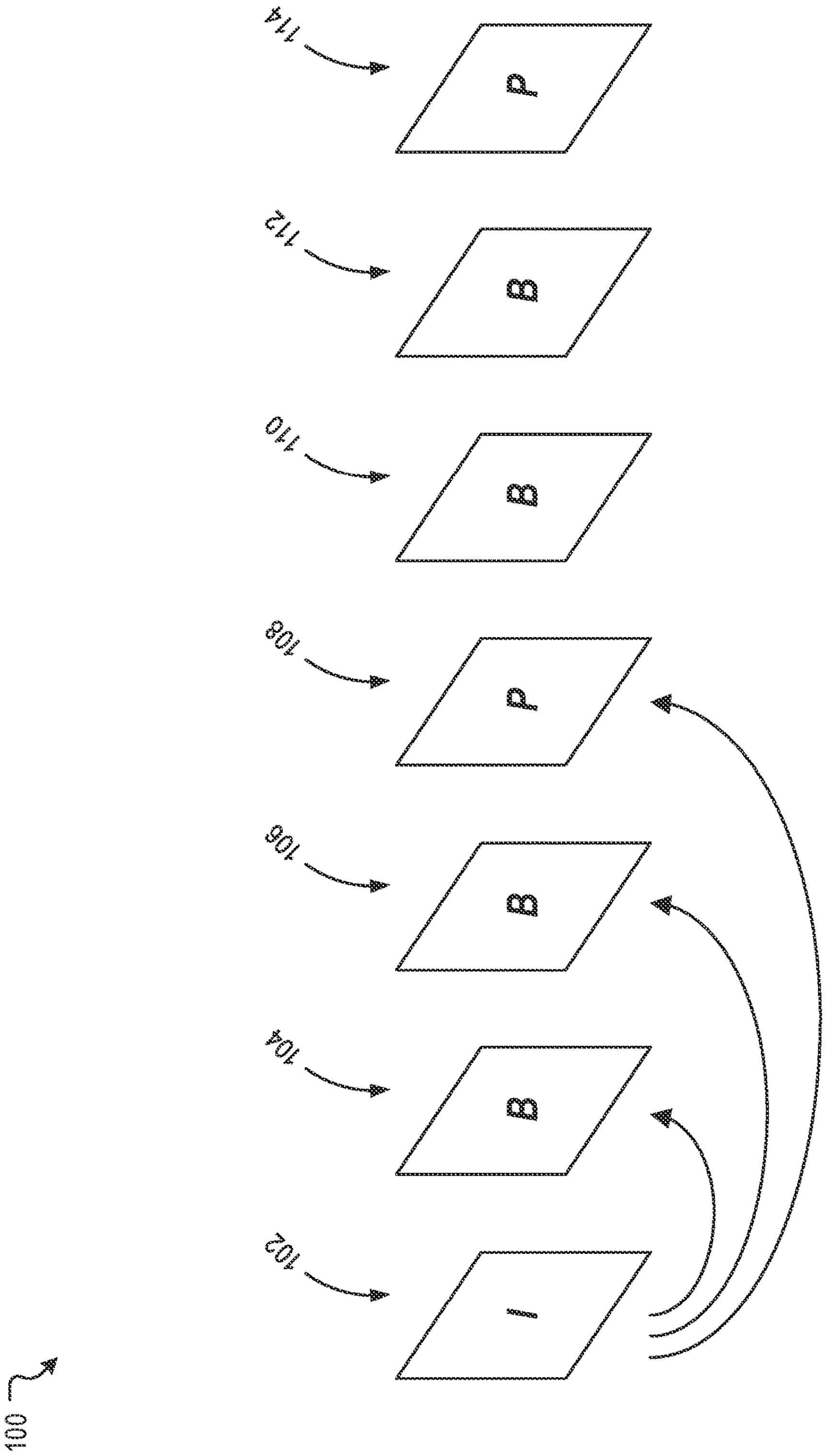
FIGS. 1A-1C illustrate an example video sequence of pictures according to various embodiments of the present disclosure.

The figures are not exhaustive and do not limit the present disclosure to the precise form disclosed.

DETAILED DESCRIPTION

As described above, the continuing consumer demand for video technology to deliver video content at higher quality and faster speed has encouraged continuing efforts to develop improvements to video technology. One way in which video technology may be improved is through improvements in video coding (e.g., video compression). By improving video coding, video data can be efficiently delivered, improving video quality and improving delivery speed. For example, the video coding standards established by MPEG generally include use of intra-picture coding and inter-picture coding. In intra-picture coding, spatial redundancy is used to correlate pixels within a picture to compress the picture. In inter-picture coding, temporal redundancy is used to correlate pixels between preceding and following pictures in a sequence. These approaches to video coding have various benefits and drawbacks. For example, intra-picture encoding generally provides less compression than inter-picture encoding. On the other hand, in inter-picture encoding, if a picture is lost during delivery, or delivered with errors, then subsequent pictures may not be able to be properly processed. Furthermore, neither intra-picture encoding nor inter-picture encoding are particularly effective at efficiently compressing video in situations, for example, involving fade effects. As fade effects can be, and are, used in a wide variety of video content, improvements to video coding with respect to fade effects would provide benefits in a wide variety of video coding applications. Thus, there is a need for technological improvements to address these and other technological problems related to video coding technologies.

Accordingly, the present application provides solutions that address the technological challenges described above. In various embodiments, hybrid precision can be implemented for weighted prediction in video coding processes. In general, weighted prediction can involve correlating a current picture to a reference picture scaled by a weighting factor (e.g., scaling factor) and an offset value (e.g., additive offset). The weighting factor and the offset value can be applied to each color component of the reference picture at, for example, a block level, slice level, or frame level, to determine the weighted prediction for the current picture. Hybrid precision can be implemented to balance between maintaining compatibility with existing video coding standards and increasing efficiency and fidelity with high bit depth (e.g., 12-bit, 14-bit, 16-bit, etc.) video. For example, in a hybrid precision implementation, weighted prediction offset values for an input video with 8-bit or 10-bit precision can be signaled using 8-bit offset precision. This facilitates maintenance of compatibility with existing video coding standards, such as the Main 10 Profile of the H.265/High Efficiency Video Coding (HEVC) standard. As another example, in a hybrid precision implementation, weighted prediction offset values for an input video with 12-bit or higher precision can be signaled using a bit depth offset precision equal to the bit depth of the input video, which in this example is 12-bit or higher. This facilitates improved efficiency and fidelity when encoding the input video.

Furthermore, in various embodiments, the use of hybrid precision can be signaled by one or more flags. In some implementations, a flag associated with use of hybrid precision can be included in a header of a compressed video stream, such as part of a sequence parameter set (SPS). In some implementations, a flag associated with use of hybrid precision can be included in a picture header in a compressed video stream. In some implementations, flags at multiple levels, such as at the SPS level and at the picture header level, can signal use of hybrid precision with different bit depths. This facilitates improved flexibility when encoding and decoding a video. Various implementations are possible. While various features of the solutions described herein may include proposed changes to the H.266/Versatile Video Coding (VVC) standard, the features of the solutions described herein are applicable to various coding schemes. The features of the solutions are discussed in further detail herein.

Figure 1B:
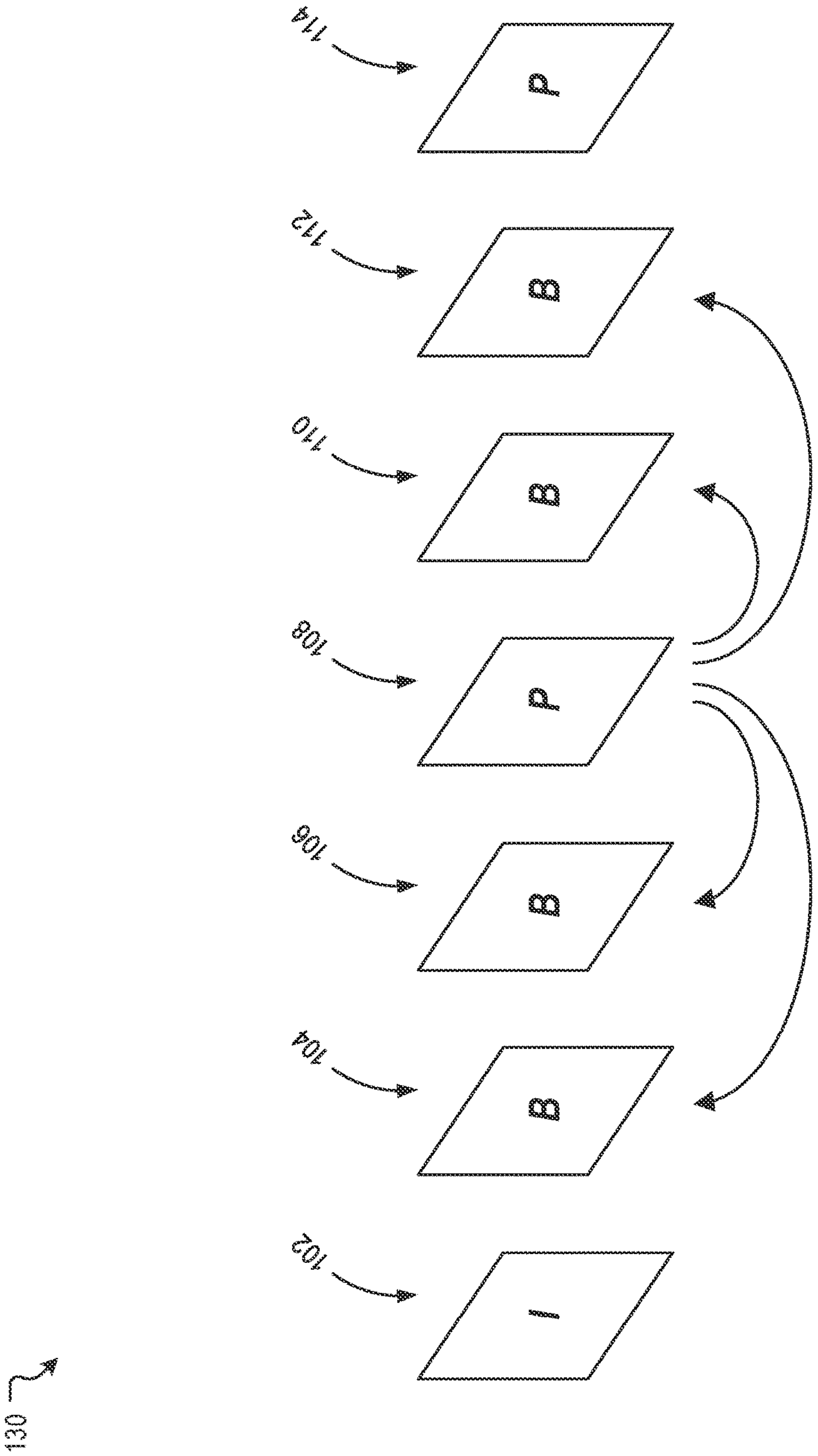
Figure 1C:
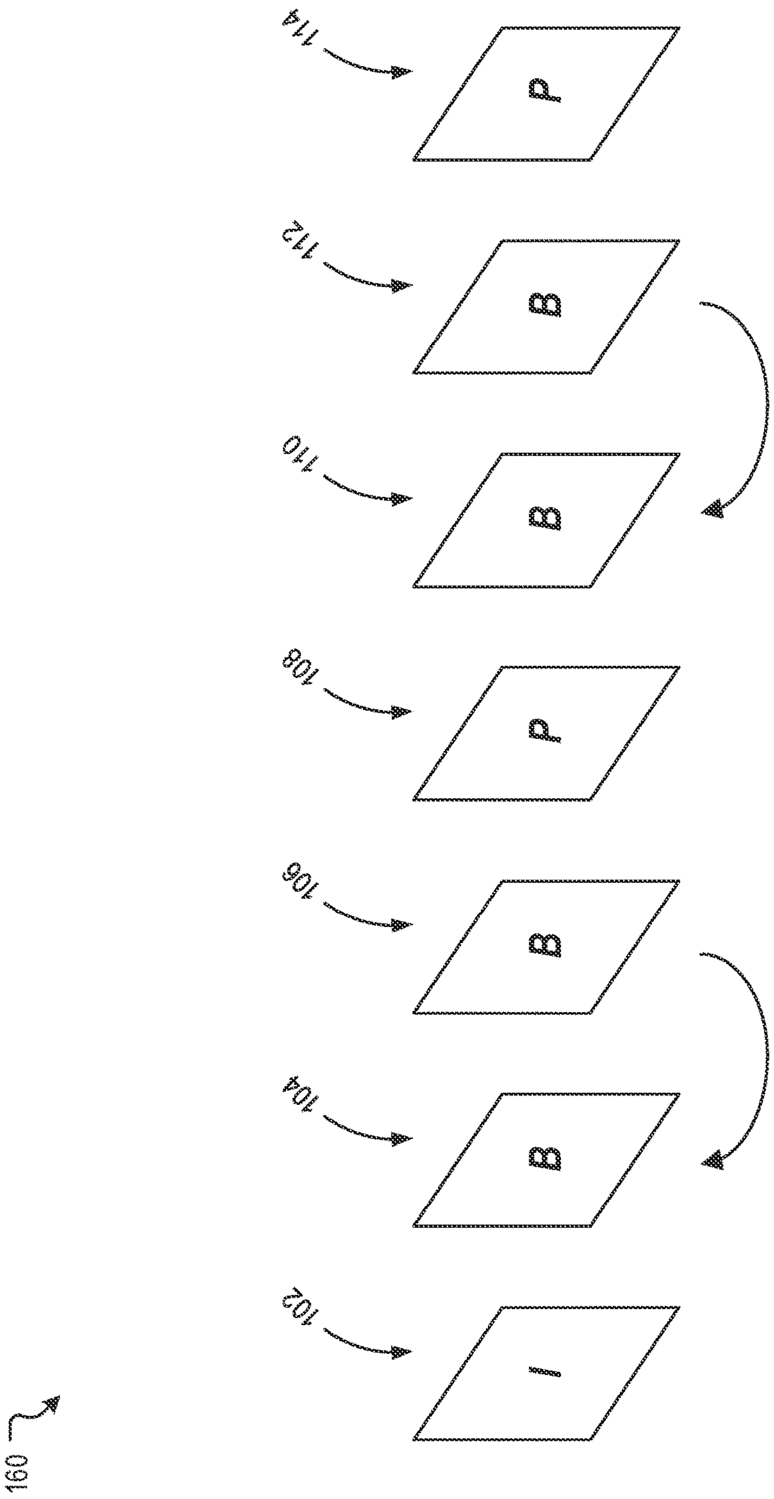

Before describing embodiments of the present disclosure in detail, it may be helpful to describe types of pictures (e.g., video frames) that are used in video coding standards, such as H.264/AVC, H.265/HEVC, and H.266/VCC. FIG. 1A-1C illustrate an example video sequence of three types of pictures that can be used in video coding. The three types of pictures include intra pictures 102 (e.g., I-pictures, I-frames), predicted pictures 108, 114 (e.g., P-pictures, P-frames), and bi-predicted pictures 104, 106, 108, 110, 112 (e.g., B-pictures, B-frames). An I-picture 102 is encoded without referring to reference pictures. In general, an I-picture 102 can serve as an access point for random access to a compressed video bitstream. A P-picture 108, 114 is encoded using an I-picture, P-picture, or B-picture as a reference picture. The reference picture can either temporally precede or temporally follow the P-picture 108, 114. In general, a P-picture 108, 114 may be encoded with more compression than an I-picture, but is not readily decodable without the reference picture to which it refers. A B-picture 104, 106, 108, 110, 112 is encoded using two reference pictures, which generally involves a temporally preceding reference picture and a temporally following reference picture. It is also possible for both reference frames to be temporally preceding or temporally following. The two reference pictures can be I-pictures, P-pictures, B-pictures, or a combination of these types of pictures. In general, a B-picture 104, 106, 108, 110, 112 may be encoded with more compression than a P-picture, but is not readily decodable without the reference pictures to which it refers.

FIG. 1A illustrates an example reference relationship 100 between the types of pictures described herein with respect to I-pictures. As illustrated in FIG. 1A, I-picture 102 can be used as a reference picture, for example, for B-pictures 104, 106 and P-picture 108. In this example, P-picture 108 may be encoded based on temporal redundancies between P-picture 108 and I-picture 102. Additionally, B-pictures 104, 106 may be encoded using I-picture 102 as one of the reference pictures to which they refer. B-pictures 104, 106 may also refer to another picture in the video sequence, such as another B-picture or a P-picture, as another reference picture.

FIG. 1B illustrates an example reference relationship 130 between the types of pictures described herein with respect to P-pictures. As illustrated in FIG. 1B, P-picture 108 can be used as a reference picture, for example, for B-pictures 104, 106, 110, 112. In this example, P-picture 108 may be encoded, for example, using I-picture 102 as a reference picture based on temporal redundancies between P-picture 108 and I-picture 102. Additionally, B-pictures 104, 106, 110, 112 may be encoded using P-picture 108 as one of the reference pictures to which they refer. B-picture 104, 106, 110, 112 may also refer to another picture in the video sequence, such as another B-picture or another P-picture, as another reference picture. As illustrated in this example, temporal redundancies between I-picture 102, P-picture 108, and B-pictures 104, 106, 110, 112 can be used to efficiently compress P-picture 108 and B-pictures 104, 106, 110, 112.

FIG. 1C illustrates an example reference relationship 160 between the types of pictures described herein with respect to B-pictures. As illustrated in FIG. 1C, B-picture 106 can be used as a reference picture, for example, for B-picture 104. B-picture 112 can be used as a reference picture, for example, for B-picture 110. In this example, B-picture 104 may be encoded using B-picture 106 as a reference picture and, for example, I-picture 102 as another reference picture. B-picture 110 may be encoded using B-picture 112 as a reference picture and, for example, P-picture 108 as another reference picture. As illustrated in this example, B-pictures generally provide for more compression than I-pictures and P-pictures by taking advantage of temporal redundancies among multiple reference pictures in the video sequence. The number and order of I-picture 102, P-pictures 108, 114, and B-pictures 104, 106, 110, 112 in FIGS. 1A-1C are an example and not a limitation on the number and order of pictures in various embodiments of the present disclosure. The H.264/AVC, H.265/HEVC, and H.266/VCC video coding standards do not impose limits on the number of I-pictures, P-pictures, or B-pictures in a video sequence. Nor do these standards impose a limit to the number of B-pictures or P-pictures between reference pictures.

As illustrated in FIGS. 1A-1C, the use of intra-picture encoding (e.g., I-picture 102) and inter-picture encoding (e.g., P-pictures 108, 114, B-pictures 104, 106, 110, 112) takes advantage of spatial redundancies in I-pictures and temporal redundancies in P-pictures and B-pictures. However, as alluded above, intra-picture encoding and inter-picture encoding alone may not efficiently compress a video sequence involving a fade effect. For example, in a video sequence involving a fade in, there are few redundancies from one picture in the video sequence to the next picture in the video sequence because the luma of the entire picture increases from one picture to the next. Because there are few redundancies from one picture in the video sequence to the next picture in the video sequence, inter-picture encoding alone may not offer effective compression. In this example, weighted prediction provides for improved compression of the video sequence. For example, a weighting factor and an offset can be applied to the luma of one picture to predict a luma of a next picture. The weighting factor and the offset, in this example, allows for more redundancies to be used for greater compression than with inter-picture encoding alone. Thus, weighted prediction provides various technical advantages in video coding.

Figure 2:
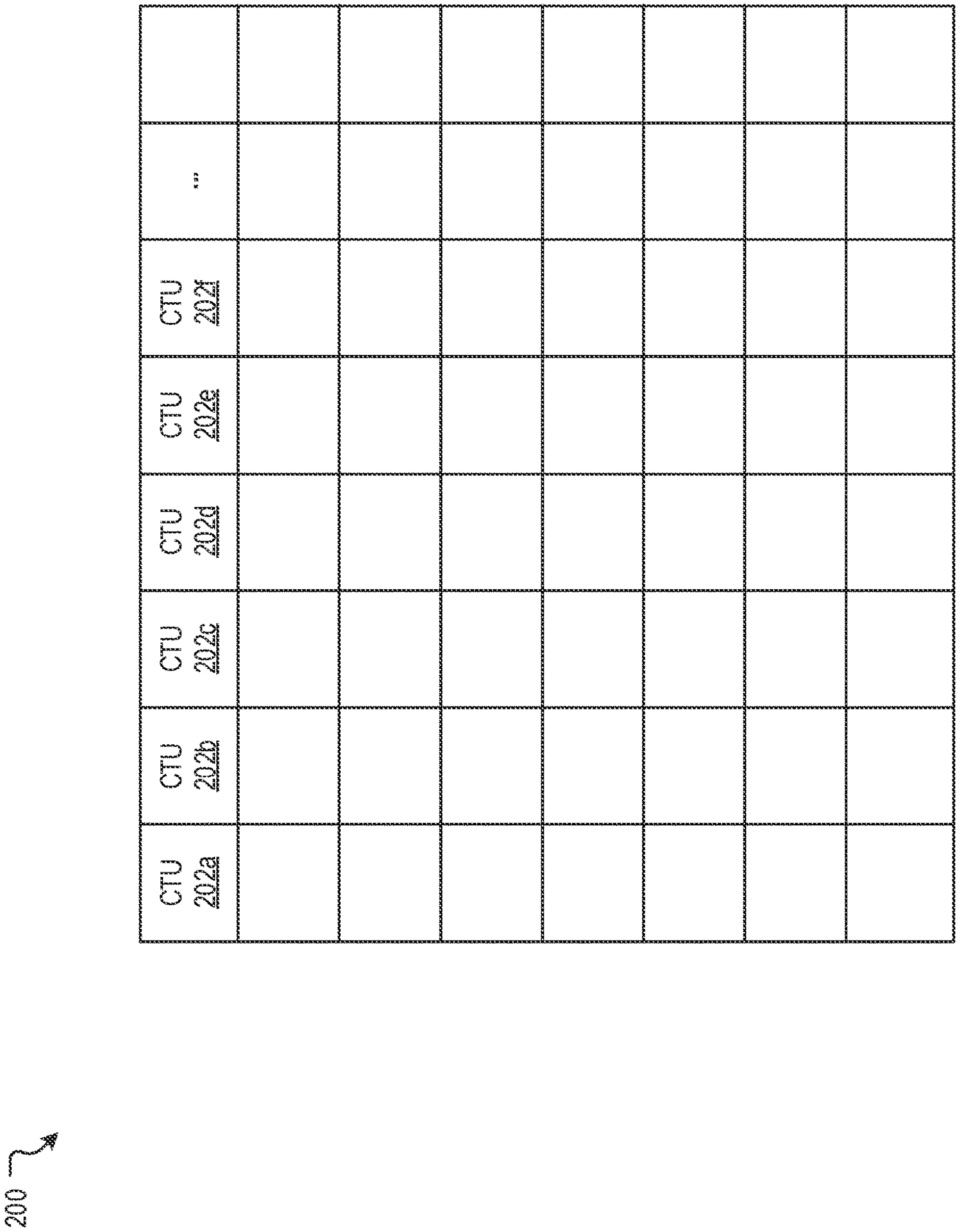
FIG. 2 illustrates an example picture in a video sequence according to various embodiments of the present disclosure.

FIG. 2 illustrates an example picture 200 in a video sequence. As illustrated in FIG. 2, the picture 200 is divided into blocks called Coding Tree Units (CTUs) 202*a*, 202*b*, 202*c*, 202*d*, 202*e*, 202*f*, etc. In various video coding schemes, such as H.265/HEVC and H.266/VCC use a block-based hybrid spatial and temporal predictive coding scheme. Dividing a picture into CTUs allows for video coding to take advantage of redundancies within a picture as well as between pictures. For example, redundancies between pixels in CTU 202*a* and CTU 202*f* can be used by an intra-picture encoding process to compress the example picture 200. As another example, redundancies between pixels in CTU 202*b* and a CTU in a temporally preceding picture or a CTU in a temporally following picture can be used by an inter-picture encoding process to compress the example picture 200. In some cases, a CTU can be a square block. For example, a CTU can be a 128×128 pixel block. Many variations are possible.

Figure 3:
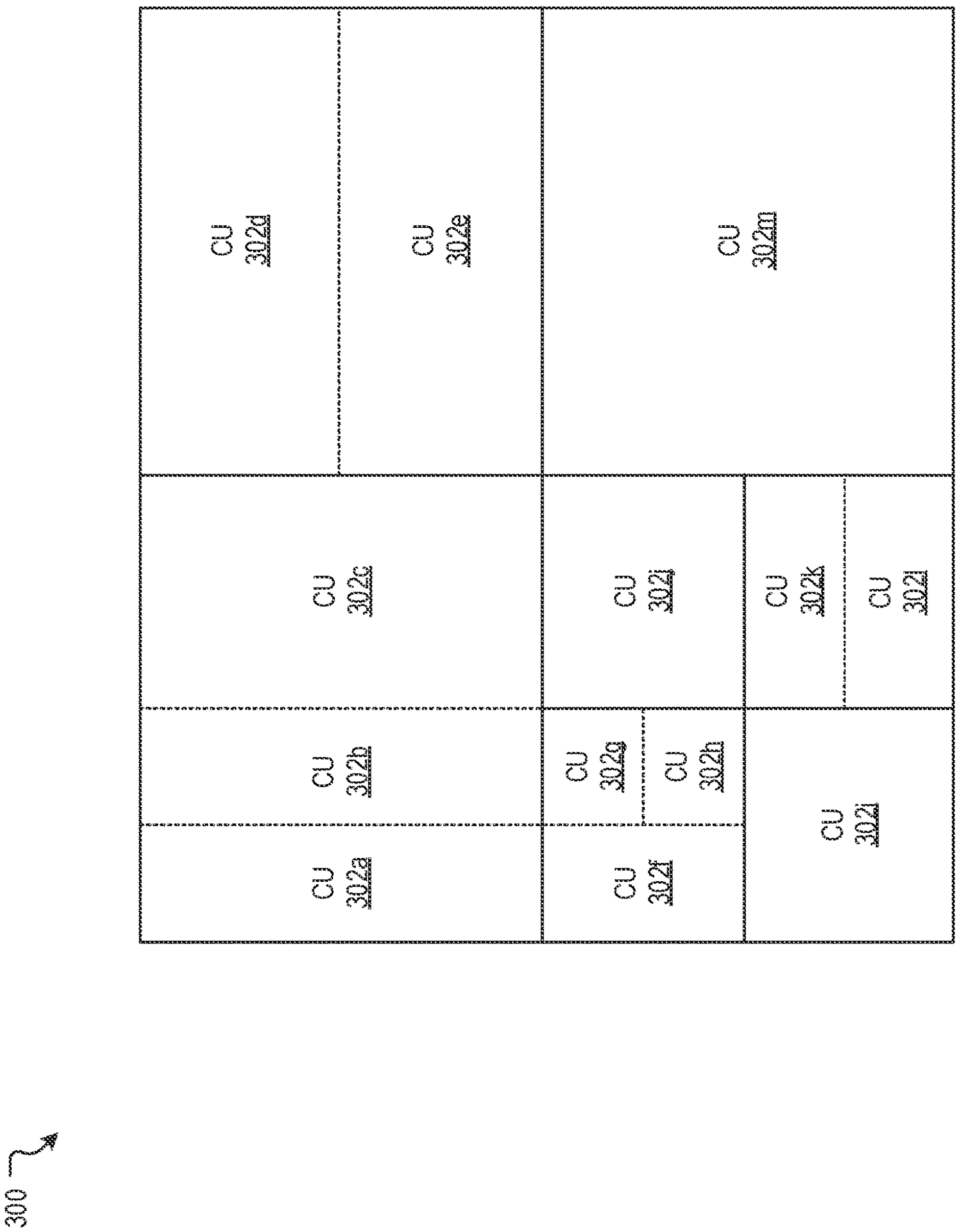
FIG. 3 illustrates an example coding tree unit in an example picture according to various embodiments of the present disclosure.

FIG. 3 illustrates an example Coding Tree Unit (CTU) 300 in a picture. The example CTU 300 can be, for example, one of the CTUs illustrated in the example picture 200 of FIG. 2. As illustrated in FIG. 3, the CTU 300 is divided into blocks called Coding Units (CUs) 302*a*, 302*b*, 302*c*, 302*d*, 302*e*, 302*f*, 302*g*, 302*h*, 302*i*, 302*j*, 302*k*, 302*l*, 302*m*. In various video coding schemes, such as H.266/VVC, CUs can be rectangular or square and can be coded without further partitioning into prediction units or transform units. A CU can be as large as its root CTU or be a subdivision of the root CTU. For example, a binary partition or a binary tree splitting can be applied to a CTU to divide the CTU into two CUs. As illustrated in FIG. 3, a quadruple partition or a quad tree splitting was applied to the example CTU 300 to divide the example CTU 300 into four equal blocks, one of which is CU 302*m*. In the top left block, a binary partition was applied to divide the top left block into two equal blocks, one of which is CU 302*c*. Another binary partition was applied to divide the other block into two equal blocks, CU 302*a* and CU 302*b*. In the top right block, a binary partition was applied to divide the top right block into two equal blocks, CU 302*d* and 302*e*. In the bottom left block, a quadruple partition was applied to divide the bottom left block into four equal blocks, which includes CU 302*i* and CU 302*j*. In the top left block of the bottom left block, a binary partition was applied to divide the block into two equal blocks, one of which is CU 302*f*. A binary partition was applied to divide the block into two equal blocks, CU 302*g* and CU 302*h*. In the bottom right block of the bottom left block, a binary partition was applied to divide the block into two equal blocks, CU 302*k* and CU 3021. Many variations are possible.

Figure 4:
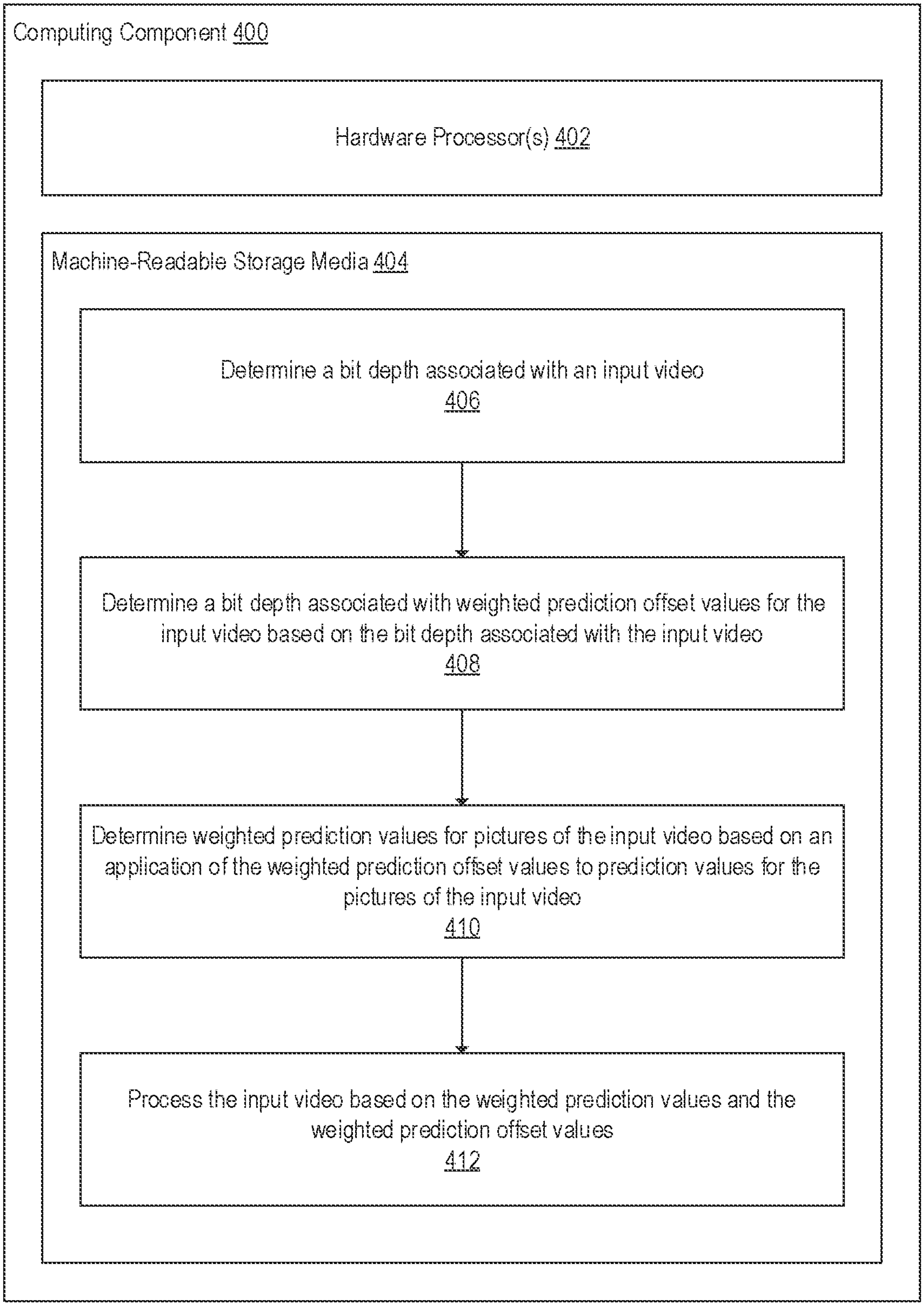
FIG. 4 illustrates a computing component that includes one or more hardware processors and machine-readable storage media storing a set of machine-readable/machine-executable instructions that, when executed, cause the one or more hardware processors to perform an illustrative method for weighted prediction for video coding, according to various embodiments of the present disclosure.

FIG. 4 illustrates a computing component 400 that includes one or more hardware processors 402 and machine-readable storage media 404 storing a set of machine-readable/machine-executable instructions that, when executed, cause the one or more hardware processors 402 to perform an illustrative method for weighted prediction for video coding, according to various embodiments of the present disclosure. The computing component 400 may be, for example, the computing system 500 of FIG. 5. The hardware processors 402 may include, for example, the processor(s) 504 of FIG. 5 or any other processing unit described herein. The machine-readable storage media 404 may include the main memory 506, the read-only memory (ROM) 508, the storage 510 of FIG. 5, and/or any other suitable machine-readable storage media described herein.

At block 406, the hardware processor(s) 402 may execute the machine-readable/machine-executable instructions stored in the machine-readable storage media 404 to determine a bit depth associated with an input video. Various video coding schemes, such as H.264/AVC and H.265/HEVC support bit depths of 8-bits, 10-bits, and more for color. Some video coding schemes, such as H.266/VVC support bit depths up to 16-bits for color. A 16-bit bit depth indicates that, for video coding schemes such as H.266/VVC, color space and color sampling can include up to 16 bits per component. Generally, using more bits per component in a video allows video coding schemes with higher bit depths, such as H.266/VVC, to support a wider range of colors than video coding schemes with lower bit depths, such as H.264/AVC and H.265/HEVC. In various embodiments, a bit depth is specified in a video. For example, a recording device may specify the bit depth at which it recorded a video. As another example, an encoding device may specify the bit depth at which it compressed a video bitstream. A decoding device may determine the bit depth of the compressed video bitstream based on bit depth information, which may be stored in metadata associated with the compressed video bitstream, specified by the encoding device. In various embodiments, a bit depth of a video can be determined based on variables associated with the input video. For example, a variable bitDepthY can represent the bit depth of luma for the input video and/or a variable bitDepthC can represent the bit depth of chroma for the input video. These variables can be set, for example, during encoding of the input video and can be read from the compressed video bitstream during decoding. For example, a video can be encoded with a bitDepthY variable set to 8-bit, representing the bit depth of luma at which the video was encoded is 8-bit. When the compressed video bitstream is decoded, the bit depth of the video, which was set to 8-bit, can be determined based on the bitDepthY variable associated with the compressed video bitstream. Determining the bit depth of the video is important to decoding the video because it allows for the components of the video to be appropriately read and decoded.

At block 408, the hardware processor(s) 402 may execute the machine-readable/machine-executable instructions stored in the machine-readable storage media 404 to determine a bit depth associated with weighted prediction offset values for the input video based on the bit depth associated with the input video. As described above, hybrid precision can be implemented for weighted prediction in video coding processes to provide increased efficiency, fidelity, and flexibility while maintaining compatibility with existing video coding standards. In various embodiments weighted prediction involves applying weighted prediction values to a reference picture of an input video. The weighted prediction value can be based on a weighting factor and an offset value applied to each color component of the reference picture. The weighted prediction can be formed for pixels of a block based on single prediction or bi-prediction. For example, for single prediction, a weighted prediction can be determined based on the formula:

$$\text{Predicted}P=\text{clip}((\text{Sample}P*w\_i+\text{power}(2,\text{LWD}-1))>>\text{LWD}+\text{offset}\_i) \quad (1)$$

where PredictedP is a weighted predictor, clip( ) is an operator that clips to a specified range of minimum and maximum pixel values. SampleP is a value of a corresponding reference pixel. w_i is a weighting factor, and offset_i is an offset value for a specified reference picture. power( ) is an operator that computes the exponentiation, the base and exponent are the first and second elements in the parenthesis. For each reference picture, w_i and offset_i may be different and i here can be 0 or 1 to indicate list 0 or list 1. The specified reference picture may be in list 0 or list 1. LWD is a log weight denominator rounding factor.

For bi-prediction, a weighted prediction can be determined based on the formula:

$$\text{Predicted}P\_\text{bi}=\text{clip}((\text{Sample}P\_0*w\_0+\text{Sample}P\_1*w\_1+\text{power}(2,\text{LWD}))>>(\text{LWD}+1)+(\text{offset}\_0+\text{offset}\_1+1)>>1) \quad (2)$$

where PredictedP_bi is the weighted predictor for bi-prediction. clip( ) is an operator that clips to a specified range of minimum and maximum pixel values. SampleP_0 and SampleP_1 are corresponding reference pixels from list 0 and list 1, respectively, for bi-prediction. w_0 is a weighting factor for list 0, and w_1 is an offset value for list 1. offset_0 is an offset value for list 0, and offset_1 is an offset value for list 1. LWD is a log weight denominator rounding factor.

In various embodiments, weighted prediction values for pictures of a compressed video can be determined based on weighting factors and offset values. The weighting factors and the offset values can be determined based on specified variables associated with the compressed video. For example, some variables (e.g., num_l0_weight, num_l1_weights) specify a number of weights signaled for entries in a reference picture list (RPL). Some variables, (e.g., luma_log2_weight_denom, luma_weight_l0_flag, delta_luma_weight_l0, luma_offset_l0, luma_weight_l1_flag, delta_luma_weight_l1, luma_offset_l1) can indicate values (or deltas) for weighting factors to be applied to luma of one or more reference pictures. For example, luma_log2_weight_denom is a base 2 logarithm of a denominator for all luma weighting factors. luma_weight_l0_flag specifies whether weighting factors for the luma component of predictions using a reference picture are present. delta_luma_weight_l0 indicates a difference of weighting factors applied to luma prediction values for predictions using a reference picture. luma_offset_l0 is an additive offset applied to luma prediction values for predictions using a reference picture. Some variables (e.g., delta_chroma_log2_weight_denom, chroma_weight_l0_flag, delta_chroma_weight_l0, delta_chroma_offset_l0, chroma_weight_l1_flag, delta_chroma_weight_l1, delta_chroma_offset_l1) can indicate values (or deltas) for weighting factors to be applied to chroma of one or more reference pictures. For example, delta_chroma_log2_weight_denom is a difference of base 2 logarithm for denominators for all chroma weighting factors. chroma_weight_l0_flag specifies whether weighting factors for chroma prediction values for predictions using a reference picture are present. delta_chroma_weight_l0 is a difference of weighting factors applied to chroma prediction values for a prediction. delta_chroma_offset_l0 is a difference of additive offsets applied to chroma prediction values for a prediction using a reference picture. Some variables (e.g., sumWeightL0Flags) can be derived from other variables. For example, sumWeightL0Flags can be equal to a sum of luma_weight_l0_flags and 2*chroma_weight_l0_flags. Many variations are possible.

In general, the weighting factor and the offset value associated with weighted prediction are limited in their range of values based on their bit depth. For example, if a weighting factor has an 8-bit bit depth, then the weighting factor can have a range of 256 integer values (e.g., −128 to 127). In some cases, the range of values for the weighting factor and the offset value can be increased by left shifting, which increases the range at the cost of precision. For example, a weighting factor with 8-bit bit depth that is left shifted still has a range of 256 integer values, but the range of integer values can be from −256 to 254 using only even numbers. In contrast, extending the bit depth for the weighting factor and the offset value allows for increased ranges of values without loss in precision associated with left shifting. In an example embodiment, the following syntax and semantics can be applied for left-shifted 8-bit weighted predictions for luma and chroma:

If color index (cIdx) is equal to 0 for luma samples, the following applies:

$$\text{log2Wd}=\text{luma\_log2\_weight\_denom}+\text{shift1}$$

When predFlagL0 is equal to 1, the variables w0 and o0 are derived as follows:

$$w0=\text{LumaWeight}L0[\text{refIdx}L0]$$

$$o0=\text{luma\_offset\_}l0[\text{refIdx}L0]<<(\text{bitDepth}-8)$$

When predFlagL1 is equal to 1, the variables w1 and o1 are derived as follows:

$$w1=\text{LumaWeight}L1[\text{refIdx}L1]$$

$$o1=\text{luma\_offset\_}l1[\text{refIdx}L1]<<(\text{bitDepth}-8)$$

Otherwise (cIdx is not equal to 0 for chroma samples), the following applies:

$$\text{log2Wd}=\text{ChromaLog2WeightDenom}+\text{shift1}$$

When predFlagL0 is equal to 1, the variables w0 and o0 are derived as follows:

$$w0=\text{ChromaWeight}L0[\text{refIdx}L0][c\text{Idx}-1]$$

$$o0=\text{ChromaOffset}L0[\text{refIdx}L0][c\text{Idx}-1]<<(\text{bitDepth}-8)$$

When predFlagL1 is equal to 1, the variables w1 and o1 are derived as follows:

$$w1=\text{ChromaWeight}L1[\text{refIdx}L1][\text{cIdx}-1]$$

$o1 = ChromaOffsetL1[refIdxL1][cIdx-1] << (bitDepth-8)$ where w0, w1, o0, of are equivalent to the variables of w_i, offset_i, i is equal to 0 or 1, in equation (1), respectively.

In various embodiments, extended precision for weighted predictions can be based on a bit depth of the input video. For example, an input video can have a bit depth luma indicated by a variable (e.g., bitDepthY) and/or a bit depth chroma indicated by a variable (e.g., bitDepthC). The bit depth of the weighted prediction can have the same bit depth as the bit depth of the input video. A variable indicating values for a weighting factor or an offset value associated with a weighted prediction can have a bit depth corresponding to a bit depth of luma and chroma of an input video. For example, an input video can be associated with a series of additive offset values for luma (e.g., luma_offset_l0[i]) that are applied to luma prediction values for a reference picture (e.g., RefPicList[0][i]). The additive offset values can have a bit depth corresponding to the bit depth of luma (e.g., bitDepthY) of the input video. The range of the additive offset values can be based on the bit depth. For example, an 8-bit bit depth can support a range of −128 to 127. A 10-bit bit depth can support a range of −512 to 511. A 12-bit bit depth can support a range of −32,768 to 32,767, and so forth. An associated flag (e.g., luma_weight_l0_flag[i]) can indicate whether weighted prediction is being utilized. For example, the associated flag can be set to 0 and the associated additive offset value can be inferred to be 0. As another example, an input video can be associated with a series of additive offset values, or offset deltas (e.g., delta_chroma_offset_l0[i][j]), that are applied to chroma prediction values for a reference picture (e.g., RefPicList[0][i]). The bit depth of the offset deltas can have a bit depth corresponding to the bit depth of chroma channel CB or chroma channel CR of the input video. In an example embodiment, the following syntax and semantics may be implemented in a coding standard:

luma_offset_l0[i] is the additive offset applied to the luma prediction value for list 0 prediction using RefPicList[0][i] (reference picture list). The value of luma_offset_l0[i] is in the range of −(1<<(bitDepthY−1)) to (1<<(bitDepthY−1))−1, inclusive, where bitDepthY is the bit depth of luma. When an associated flag luma_weight_l0_flag[i] is equal to 0, luma_offset_l0[i] is inferred to be equal to 0.

delta_chroma_offset_l0[i][j] is the difference of the additive offset applied to the chroma prediction values for list 0 prediction using RefPicList[0][i] (reference picture list) with j equal to 0 for chroma channel Cb and j equal to 1 for chroma channel Cr.

In this example, the chroma offset value, ChromaOffsetL0[i][j] can be derived as follows:

$$ChromaOffsetL0[i][j] = Clip3(-(1<<(bitDepthC-1)), (1<<(bitDepthC-1))-1,)-1,((1<<(bitDepthC-1))+delta\_chroma\_offset\_l0[i][j]-(((1<<(bitDepthC-1))*ChromaWeightL0[i][j])>>ChromaLog2WeightDenom)))$$

where ChromaOffsetL0 is the chroma offset value, bitDepthC is the bit depth of the chroma, ChromaWeightL0 is an associated chroma weighting factor, and ChromaLog2WeightDenom is a logarithm denominator for the associated chroma weighting factor.

As illustrated in this example, the value of delta_chroma_offset_l0[i][j] is in the range of −4*(1<<(bitDepthC−1)) to 4*((1<<(bitDepthC−1))−1), inclusive. When chroma_weight_l0_flag[i] is equal to 0, ChromaOffsetL0[i][j] can be inferred to be equal to 0. In this example, because the bit depth of the weighting factors and offset values correspond with the bit depth of the input video, the weighting factors and offset values are not left shifted. The following syntax and semantics may be implemented:

$$o0 = luma\_offset\_l0[refIdxL0]$$

$$o1 = luma\_offset\_l1[refIdxL1]$$

$$o0 = ChromaOffsetL0[refIdxL0][cIdx-1]$$

$$o1 = ChromaOffsetL1[refIdxL1][cIdx-1]$$

where luma_offset_l0[refIdxL0] is a luma offset value associated with a list 0 reference picture, luma_offset_l1[refIdxL1] is a luma offset value associated with a list 1 reference picture, ChromaOffsetL0[refIdxL0][cIdx−1] is a chroma offset value associated with a list 0 reference picture, ChromaOffsetL1[refIdxL1][cIdx−1] is a chroma offset value associated with a list 1 reference picture. As described above, these offset values are not left shifted.

In various embodiments, hybrid precision for weighted prediction can be implemented to improve efficiency, fidelity, and flexibility while maintaining compatibility. In implementations using hybrid precision for weighted prediction, a precision or bit depth of weighted prediction offset values for an input video can be determined based on a precision or bit depth associated with the input video. The precision or bit depth of the weighted prediction offset values can be enabled or disabled for particular sequences or pictures within the input video. In some implementations, the precision or bit depth of weighted prediction offset values is 8-bit for an input video that has 8-bit or 10-bit precision. These implementations can be compatible with the Main 10 Profile of the H.265/High Efficiency Video Coding (HEVC) standard. In some implementations, the precision or bit depth of weighted prediction offset values for an input video is equal to the precision or bit depth of the input video. For example, 12-bit weighted prediction offset values can be used for a 12-bit input video. The weighted prediction offset values can fall within a range determined by half range values. For example, a half range value can be calculated with 1<<(bit_depth−1) of an input video if the bit depth of the input video is 12-bit or higher. The half range value can be calculated with 1<<7 if the bit depth of the input video is 8-bit or 10-bit. As an illustrative example, variables associated with weighted prediction can be implemented as follows:

$$WpOffsetBdShiftY = high\_precision\_offsets\_enabled\_flag ? (BitDepthY==10?(BitDepthY-8):0):(BitDepthY-8)$$

$$WpOffsetBdShiftC = high\_precision\_offsets\_enabled\_flag ? (BitDepthC==10?(BitDepthC-8):0):(BitDepthC-8)$$

$$WpOffsetHalfRangeY = 1<<(high\_precision\_offsets\_enabled\_flag ? (BitDepthY==10?7:(BitDepthY-1)):7)$$

$$WpOffsetHalfRangeC = 1<<(high\_precision\_offsets\_enabled\_flag ? (BitDepthC==10?7:(BitDepthC-1)):7)$$

where WPOffsetBDShiftY is a weighted prediction offset value associated with luma. WpOffsetBdShiftC is a weighted prediction offset value associated with chroma. WpOffsetHalfRangeY is a weighted prediction offset half range value associated with luma. WpOffsetHalfRangeC is a weighted prediction offset half range value associated with chroma.

As illustrated in the above example, when a hybrid precision flag (e.g., high_precision_offsets_enabled_flag) is set to 1, or enabled, the weighted prediction offset values associated with luma and chroma are 8-bit when a bit depth luma and bit depth chroma of an input video is 10-bit or 8-bit. The weighted prediction offset values associated with luma and chroma are equal to the bit depth luma and bit depth chroma of the input video when the bit depth luma and bit depth chroma of the input video is 12-bit or higher. The ranges for the weighted prediction offset values are also based on the bit depth luma and bit depth chroma of the input video. In an example embodiment, the hybrid precision implementation described above can be implemented with the following syntax and semantics:

luma_offset_l0[i] is the additive offset applied to the luma prediction value for list 0 prediction using RefPicList[0][ i]. The value of luma_offset_l0[i] shall be in the range of −WpOffsetHalfRangeY to WpOffsetHalfRangeY, inclusive. When luma_weight_l0_flag[i] is equal to 0, luma_offset_l0[i] is inferred to be equal to 0.

delta_chroma_offset_l0[i][j] is the difference of the additive offset applied to the chroma prediction values for list 0 prediction using RefPicList[0][j] with j equal to 0 for Cb and j equal to 1 for Cr.

In this example, the chroma offset value, ChromaOffsetL0[i][j] is derived as follows:

$$\text{ChromaOffset}L0[i][j]=\text{Clip3}(-\text{WpOffsetHalfRange}C, \text{WpOffsetHalfRange}C-1,(\text{WpOffsetHalfRange}C+\text{delta\_chroma\_offset\_}l0[i][j]-((\text{WpOffsetHalfRange}C*\text{ChromaWeight}L0[i][j])>>\text{ChromaLog2WeightDenom})))$$

where ChromaOffsetL0 is the chroma offset value, WpOffsetHalfRangeC is the weighted prediction offset half range value for chroma, ChromaWeightL0 is an associated chroma weighting factor, and ChromaLog2WeightDenom is a logarithm denominator for the associated chroma weighting factor.

As illustrated in this example, the value of delta_chroma_offset_l0[i][j] is in the range of −4*WpOffsetHalfRangeC to 4*WpOffsetHalfRangeC−1, inclusive. When chroma_weight_l0_flag [i] is equal to 0, ChromaOffsetL0M [j] can be inferred to be equal to 0. In this example, the following syntax and semantics may be implemented:

$$o0=\text{luma\_offset\_}l0[\text{refIdx}L0]<<\text{WpOffsetBdShift}Y$$

$$o1=\text{luma\_offset\_}l1[\text{refIdx}L1]<<\text{WpOffsetBdShift}Y$$

$$o0=\text{ChromaOffset}L1[\text{refIdx}L0][c\text{Idx}-1]<<\text{WpOffsetBdShift}C$$

$$o1=\text{ChromaOffset}L1[\text{refIdx}L1][c\text{Idx}-1]<<\text{WpOffsetBdShift}C$$

where luma_offset_l0[refIdxL0] is a luma offset value associated with a list 0 reference picture, luma_offset_l1[refIdxL1] is a luma offset value associated with a list 1 reference picture, ChromaOffsetL0[refIdxL0][cIdx−1] is a chroma offset value associated with a list 0 reference picture, ChromaOffsetL1[refIdxL1][cIdx−1] is a chroma offset value associated with a list 1 reference picture. o0, o1 can be equivalent to the variables of offset_i, where i is equal to 0 or 1, in equation (1), respectively.

While the above examples include example syntax and semantics for list 0 luma offset values and chroma offset values, the examples can be applied to list 1 values as well. Additionally, in various embodiments, a minimum pixel value and a maximum pixel value for a picture (e.g., video frame) can be specified. Final predicted samples from weighted prediction can be clipped to the minimum pixel value or the maximum pixel value for the picture.

In various embodiments, weighted prediction in a compressed video bitstream can be determined based on specified variables or flags associated with the input video. For example, a flag can be set to indicate that a picture in the compressed video involves weighted prediction. In some embodiments, a flag (e.g., sps_weighted_pred_flag) can be set to 1 to specify that weighted prediction may be applied to P pictures (or P slices) in a sequence of compressed video. The flag can be set to 0 to specify that weighted prediction may not be applied to the P pictures (or P slices) in the sequence of compressed video. A flag (e.g., pps_weighted_pred_flag) can be set to 1 to specify that weighted prediction may be applied to a P picture (or P slice) in a compressed video. The flag can be set to 0 to specify that weighted prediction may not be applied to the P picture (or P slice) in the compressed video. In some embodiments, a flag (e.g., sps_weighted_bipred_flag) can be set to 1 to specify that weighted prediction may be applied to B pictures (or B slices) in a sequence of compressed video. The flag can be set to 0 to specify that weighted prediction may not be applied to the B pictures (or B slices) in the sequence of compressed video. A flag (e.g., pps_weighted_bipred_flag) can be set to 1 to specify that weighted prediction may be applied to a B picture (or B slice) in a compressed video. The flag can be set to 0 to specify that weighted prediction may not be applied to the B picture (or B slice) in the compressed video. In some embodiments, a flag (e.g., pps_wp_info_in_ph_flag) can specify whether weighted prediction information is present in a picture header (PH) syntax structure and not present in slide headers referring to a picture parameter set (PPS). Many variations are possible.

In various embodiments, flags associated with multiple levels of a video can signal hybrid precision for weighted prediction. For example, a flag associated with a sequence can signal whether hybrid precision for weighted prediction is enabled for a sequence of compressed video. The flag associated with the sequence can be included in a sequence parameter set (SPS) associated with the sequence of compressed video. A flag associated with a picture can signal whether hybrid precision for weighted prediction is enabled for a picture in a sequence of compressed video. The flag associated with the picture can be included in a picture header associated with the picture. Using a flag associated with a sequence in conjunction with using a flag for a picture can enable precise control over which sequences and pictures in a compressed video use hybrid precision for weighted prediction.

For example, a flag (e.g., sps_high_precision_offsets_enabled_flag) can be set to 1 to specify that hybrid precision for weighted prediction may be applied to pictures (or slices) in a sequence of compressed video (e.g., coded layer video sequence (CLVS)). The flag can be set to 0 to specify that hybrid precision for weighted prediction may not be applied to the pictures (or slices) in the sequence of compressed video (e.g., the CLVS). A flag (e.g., ph_high_precision_offsets_enabled_flag) can be set to 1 to specify that hybrid precision for weighted prediction is enabled for a current picture of compressed video. The flag can be set to 0 to specify that hybrid precision for weighted prediction is disabled for the current picture of compressed video. In some cases, hybrid precision for weighted prediction can be disabled for a current picture where no flag is set. In some implementations, when the flag is set to 1, weighted prediction offset values can use a precision or bit-depth equal to 8-bit when precision or bit-depth of the compressed video is 8-bit or 10-bit. Otherwise, the weighted prediction offset values can use a precision or bit-depth equal to the precision or bit-depth of the compressed video. For example, the weighted prediction offset values can use 16-bit precision for a compressed video that uses 16-bit precision and use 8-bit precision for a compressed video that uses 10-bit precision. Many variations are possible.

At block 410, the hardware processor(s) 402 may execute the machine-readable/machine-executable instructions stored in the machine-readable storage media 404 to determine weighted prediction values for pictures of the input video based on an application of the weighted prediction offset values to prediction values for the pictures of the input video. As described above, weighted prediction can be applied to a reference picture of an input video for improved compression of a picture in the input video. In implementations involving hybrid precision for weighted prediction, a weighting factor and a weighted prediction offset value can be applied to a color component of a reference picture in an input video to determine a weighted prediction value for a picture in the input video. In some implementations, the weighted prediction offset value can be associated with a precision or a bit depth based on a precision or a bit depth of the input video. In some implementations, the weighting factor and the weighted prediction value can be associated with a precision or a bit depth based on the precision or the bit depth of the weighted prediction offset value or the input video. In some implementations, hybrid precision for weighted prediction is applied to particular sequences or particular pictures of an input video. In these implementations, a sequence or a picture where weighted prediction is disabled may not be associated with any weighted prediction values. For example, an input video can be associated with 16-bit precision. Hybrid precision for weighted prediction can be implemented for the input video. Based on the 16-bit precision of the input video, weighted prediction offset values, weighting factors, and weighted prediction values can be associated with 16-bit precision. In this example, flags at the sequence level and at the picture level can be used to signal which sequences and pictures of the input video have used weighted prediction. A flag in the sequence parameter set (SPS) for a sequence can indicate that weighted prediction with hybrid precision is used for the sequence. Within the sequence, flags in the picture header of pictures in the sequence can identify which pictures in the sequence use weighted prediction with hybrid precision. Many variations are possible.

At block 412, the hardware processor(s) 402 may execute the machine-readable/machine-executable instructions stored in the machine-readable storage media 404 to process the input video based on the weighted prediction values and the weighted prediction offset values. In various embodiments, the weighted prediction values and the weighted prediction offset values can be used as part of a video encoding process or as part of a video decoding process. For example, an encoding process involving hybrid precision for weighted prediction can be applied to an input video to process the input video. During the encoding process, weighting factors and weighted prediction offset values can applied to color components of a reference picture to determine weighted prediction values for a picture. The weighted prediction offset values can be set using a bit depth based on a bit depth used to encode the input video. When the compressed video bitstream is decoded, the bit depth of the weighted prediction offset values can be determined based on the bit depth of the compressed video bitstream. As another example, during an encoding process applied to an input video, hybrid precision for weighted prediction can be applied to particular sequences and particular pictures of the input video. Flags at the sequence level and at the picture level can be set to signal the use of weighted precision for those particular sequences and pictures. Many variations are possible.

Figure 5:
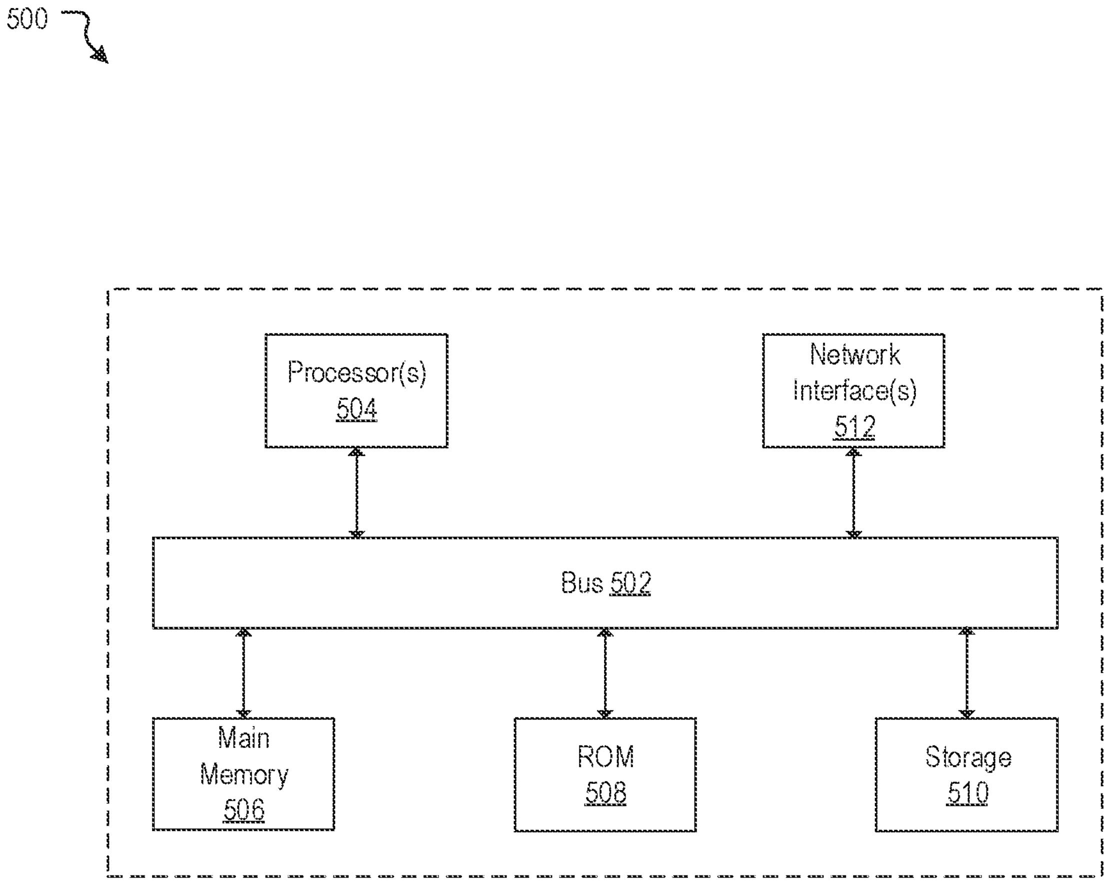
FIG. 5 illustrates a block diagram of an example computer system in which various embodiments of the present disclosure may be implemented.

FIG. 5 illustrates a block diagram of an example computer system 500 in which various embodiments of the present disclosure may be implemented. The computer system 500 can include a bus 502 or other communication mechanism for communicating information, one or more hardware processors 504 coupled with the bus 502 for processing information. The hardware processor(s) 504 may be, for example, one or more general purpose microprocessors. The computer system 500 may be an embodiment of a video encoding module, video decoding module, video encoder, video decoder, or similar device.

The computer system 500 can also include a main memory 506, such as a random access memory (RAM), cache and/or other dynamic storage devices, coupled to the bus 502 for storing information and instructions to be executed by the hardware processor(s) 504. The main memory 506 may also be used for storing temporary variables or other intermediate information during execution of instructions by the hardware processor(s) 504. Such instructions, when stored in a storage media accessible to the hardware processor(s) 504, render the computer system 500 into a special-purpose machine that can be customized to perform the operations specified in the instructions.

The computer system 500 can further include a read only memory (ROM) 508 or other static storage device coupled to the bus 502 for storing static information and instructions for the hardware processor(s) 504. A storage device 510, such as a magnetic disk, optical disk, or USB thumb drive (Flash drive), etc., can be provided and coupled to the bus 502 for storing information and instructions.

Computer system 500 can further include at least one network interface 512, such as a network interface controller module (NIC), network adapter, or the like, or a combination thereof, coupled to the bus 502 for connecting the computer system 500 to at least one network.

In general, the word “component,” “modules,” “engine,” “system,” “database,” and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 500, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques or technology described herein using customized hard-wired logic, one or more ASICs or FPGAs, firmware and/or program logic which in combination with the computer system 500 that causes or programs the computer system 500 to be a special-purpose machine. According to one or more embodiments, the techniques described herein are performed by the computer system 500 in response to the hardware processor(s) 504 executing one or more sequences of one or more instructions contained in the main memory 506. Such instructions may be read into the main memory 506 from another storage medium, such as the storage device 510. Execution of the sequences of instructions contained in the main memory 506 can cause the hardware processor(s) 504 to perform process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 510. The volatile media can include dynamic memory, such as the main memory 506. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, an NVRAM, any other memory chip or cartridge, and networked versions of the same.

Non-transitory media is distinct from but may be used in conjunction with transmission media. The transmission media can participate in transferring information between the non-transitory media. For example, the transmission media can include coaxial cables, copper wire and fiber optics, including the wires that comprise the bus 502. The transmission media can also take a form of acoustic or light waves, such as those generated during radio-wave and infra-red data communications.

The computer system 500 also includes a network interface 518 coupled to bus 502. Network interface 518 provides a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 518, which carry the digital data to and from computer system 500, are example forms of transmission media.

The computer system 500 can send messages and receive data, including program code, through the network(s), network link and network interface 518. In the Internet example, a server might transmit a requested code for an application program through the Internet, the ISP, the local network and the network interface 518.

The received code may be executed by processor 504 as it is received, and/or stored in storage device 510, or other non-volatile storage for later execution.

ADDITIONAL EMBODIMENTS

Various embodiments of the present disclosure provide a computer-implemented method comprising determining a bit depth associated with the input video; determining a bit depth associated with weighted prediction offset values for the input video based on the bit depth associated with the input video; determining weighted prediction values for pictures of the input video based on an application of the weighted prediction offset values to prediction values for the pictures of the input video; and processing the input video based on the weighted prediction values and the weighted prediction offset values.

In some embodiments of the computer-implemented method, the bit depth associated with the input video is 8-bit or 10-bit and the bit depth associated with the weighted prediction offset values is 8-bit.

In some embodiments of the computer-implemented method, the bit depth associated with the input video is 12-bit or greater and the bit depth associated with the weighted prediction offset values is the same as the bit depth associated with the input video.

In some embodiments of the computer-implemented method, weighted prediction is applied to a sequence in the input video and a sequence level flag is set to signal that the weighted prediction is applied to the sequence.

In some embodiments of the computer-implemented method, weighted prediction is applied to a picture in the input video and a picture level flag is set to signal that the weighted prediction is applied to the picture.

In some embodiments of the computer-implemented method, weighted prediction is applied to a sequence of pictures in the input video, wherein a sequence level flag is set to signal that the weighted prediction is applied to the sequence, and wherein picture level flags are set to signal which of the pictures in the sequence have weighted prediction applied.

In some embodiments, the computer-implemented method further comprises determining a weighted prediction offset half range value based on the bit depth of the input video, wherein the weighted prediction offset values are within a range based on the weighted prediction offset half range value.

In some embodiments of the computer-implemented method, the processing the input video includes encoding the input video or decoding the input video.

Various embodiments of the present disclosure provide an encoder comprising at least one processor; and a memory storing instructions that, when executed by the at least one processor, cause the encoder to perform determining a bit depth associated with the input video; determining a bit depth associated with weighted prediction offset values for the input video based on the bit depth associated with the input video; determining weighted prediction values for pictures of the input video based on an application of the weighted prediction offset values to prediction values for the pictures of the input video; encoding the input video based on the weighted prediction values and the weighted prediction offset values; and setting picture level flags in the encoded input video to signal which pictures in the encoded input video have weighted prediction applied.

In some embodiments of the encoder, the bit depth associated with the input video is 8-bit or 10-bit and the bit depth associated with the weighted prediction offset values is 8-bit.

In some embodiments of the encoder, the bit depth associated with the input video is 12-bit or greater and the bit depth associated with the weighted prediction offset values is the same as the bit depth associated with the input video.

In some embodiments of the encoder, weighted prediction is applied to a sequence in the input video and a sequence level flag is set to signal that the weighted prediction is applied to the sequence.

In some embodiments of the encoder, the application of the weighted prediction offset values to the prediction values for the pictures of the input video is further based on weighting factors associated with the pictures.

In some embodiments, the instructions further cause the encoder to perform determining a weighted prediction offset half range value based on the bit depth of the input video, wherein the weighted prediction offset values are within a range based on the weighted prediction offset half range value.

Various embodiments of the present disclosure provide a decoder comprising at least one processor; and a memory storing instructions that, when executed by the at least one processor, cause the decoder to perform determining a bit depth associated with the input video; determining a bit depth associated with weighted prediction offset values for the input video based on the bit depth associated with the input video; determining a sequence level flag in the input video that indicates a sequence of the input video has weighted prediction applied; determining weighted prediction values for the sequence of the input video based on an application of the weighted prediction offset values to prediction values for the sequence of the input video; and decoding the input video based on the weighted prediction values and the weighted prediction offset values.

In some embodiments of the decoder, the bit depth associated with the input video is 8-bit or 10-bit and the bit depth associated with the weighted prediction offset values is 8-bit.

In some embodiments of the decoder, the bit depth associated with the input video is 12-bit or greater and the bit depth associated with the weighted prediction offset values is the same as the bit depth associated with the input video.

In some embodiments of the decoder, the sequence level flag is included in a sequence parameter set associated with the sequence of the input video.

In some embodiments of the decoder, the application of the weighted prediction offset values to the prediction values for the sequence of the input video is further based on weighting factors associated with pictures in the sequence.

In some embodiments, the instructions further cause the decoder to perform determining a weighted prediction offset half range value based on the bit depth of the input video, wherein the weighted prediction offset values are within a range based on the weighted prediction offset half range value.

Systems and methods of the present disclosure provide solutions that address technological challenges related to video coding technologies. Hybrid precision for weighted prediction can be implemented to improve efficiency, fidelity and flexibility while maintaining compatibility with existing video coding standards. Various features described in the present disclosure may be implemented as proposed changes to the H.266/Versatile Video Coding standard.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method for encoding or decoding an input video comprising:

determining a bit depth of the input video;

determining, for the input video, a bit depth of offset values for weighted prediction based on the bit depth of the input video;

determining weighted prediction values for pictures of the input video based on an application of the offset values for weighted prediction to prediction values for the pictures of the input video; and processing the input video based on the weighted prediction values and the offset values for weighted prediction.

2. The computer-implemented method of claim 1, wherein the bit depth of the input video is 8-bit or 10-bit, and the bit depth of the offset values for weighted prediction is 8-bit.

3. The computer-implemented method of claim 1, wherein the bit depth of the input video is 12-bit or greater, and the bit depth of the offset values for weighted prediction is the same as the bit depth of the input video.

4. The computer-implemented method of claim 1, wherein weighted prediction is applied to a sequence in the input video and a sequence level flag is set to signal that the weighted prediction is applied to the sequence; or wherein weighted prediction is applied to a picture in the input video and a picture level flag is set to signal that the weighted prediction is applied to the picture.

5. The computer-implemented method of claim 1, wherein weighted prediction is applied to a sequence of pictures in the input video, wherein a sequence level flag is set to signal that the weighted prediction is applied to the sequence, and wherein picture level flags are set to signal which of the pictures in the sequence have weighted prediction applied.

6. The computer-implemented method of claim 1, further comprising:

determining a weighted prediction offset half range value based on the bit depth of the input video, wherein the offset values for weighted prediction are within a range based on the weighted prediction offset half range value.

7. The computer-implemented method of claim 1, wherein the processing the input video includes encoding the input video or decoding the input video.

8. The computer-implemented method of claim 1, wherein in a case where a hybrid precision for the weighted prediction is applied to pictures in a sequence of the input video, a sequence level flag is set to signal that:

the bit depth of the offset values for weighted prediction is 8-bit when the bit depth of the input video is 10-bit, and the bit depth of the offset values for weighted prediction is the same as the bit depth of the input video when the bit depth of the input video is 12-bit or greater; and in a case where the hybrid precision for the weighted prediction is applied to a current picture of the input video, a picture level flag is set to signal that:

the bit depth of offset values for weighted prediction is 8-bit when the bit depth of the input video is 10-bit, and the bit depth of the offset values for weighted prediction is the same as the bit depth of the input video when the bit depth of the input video is 12-bit or greater.

9. The computer-implemented method of claim 1, wherein determining the weighted prediction values for the pictures of the input video based on the application of the offset values for weighted prediction to the prediction values for the pictures of the input video comprises:

determining the weighted prediction values for the pictures of the input video based on an application of the offset values for weighted prediction to reference pictures for the pictures of the input video when a weighted prediction is applied.

10. A non-transitory computer-readable storage medium, having a computer program stored thereon, wherein the computer program, when executed by a processor, enables the processor to perform the steps of the computer-implemented method of claim 1 to generate a bitstream and store the bitstream on the non-transitory computer-readable storage medium.

11. An encoder comprising:

at least one processor; and a memory storing instructions that, when executed by the at least one processor, cause the encoder to perform:

determining a bit depth of an input video;

determining, for the input video, a bit depth of offset values for weighted prediction based on the bit depth of the input video;

determining weighted prediction values for pictures of the input video based on an application of the offset values for weighted prediction to prediction values for the pictures of the input video;

encoding the input video based on the weighted prediction values and the offset values for weighted prediction; and setting picture level flags in the encoded input video to signal which pictures in the encoded input video have weighted prediction applied.

12. The encoder of claim 11, wherein the bit depth of the input video is 8-bit or 10-bit, the bit depth of the offset values for weighted prediction is 8-bit.

13. The encoder of claim 11, wherein the bit depth of the input video is 12-bit or greater and the bit depth of the offset values for weighted prediction is the same as the bit depth of the input video.

14. The encoder of claim 11, wherein weighted prediction is applied to a sequence in the input video and a sequence level flag is set to signal that the weighted prediction is applied to the sequence.

15. The encoder of claim 11, wherein the application of the offset values for weighted prediction to the prediction values for the pictures of the input video is further based on weighting factors associated with the pictures.

16. The encoder of claim 11, the instructions further cause the encoder to perform:

determining a weighted prediction offset half range value based on the bit depth of the input video, wherein the offset values for weighted prediction are within a range based on the weighted prediction offset half range value.

17. A decoder comprising:

at least one processor; and a memory storing instructions that, when executed by the at least one processor, cause the decoder to perform:

determining a bit depth of an input video;

determining, for the input video, a bit depth of offset values for weighted prediction based on the bit depth of the input video;

determining a sequence level flag in the input video that indicates a sequence of the input video has weighted prediction applied;

determining weighted prediction values for the sequence of the input video based on an application of the offset values for weighted prediction to prediction values for the sequence of the input video; and decoding the input video based on the weighted prediction values and the offset values for weighted prediction.

18. The decoder of claim 17, wherein in a case that the bit depth of the input video is 8-bit or 10-bit, the bit depth of the offset values for weighted prediction is 8-bit; or in a case that the bit depth of the input video is 12-bit or greater, the bit depth of the offset values for weighted prediction is the same as the bit depth of the input video.

19. The decoder of claim 17, wherein the sequence level flag is included in a sequence parameter set associated with the sequence of the input video.

20. The decoder of claim 17, wherein the application of the offset values for weighted prediction to the prediction values for the sequence of the input video is further based on weighting factors associated with pictures in the sequence.

* * * * *